United States Patent

Grech-Cini

(12) United States Patent
(10) Patent No.: US 6,844,818 B2
(45) Date of Patent: Jan. 18, 2005

(54) SMOKE DETECTION

(75) Inventor: Henry Joseph Grech-Cini, Guildford (GB)

(73) Assignee: VSD Limited (GB)

( * ) Notice: Subject to any disclaimer, the term of this patent is extended or adjusted under 35 U.S.C. 154(b) by 222 days.

(21) Appl. No.: 09/838,795

(22) Filed: Apr. 20, 2001

(65) Prior Publication Data

US 2002/0024446 A1 Feb. 28, 2002

Related U.S. Application Data

(63) Continuation of application No. PCT/GB99/03459, filed on Oct. 20, 1999.

(30) Foreign Application Priority Data

Oct. 20, 1998 (GB) .............................. 9822956

(51) Int. Cl.[7] .............................................. G08B 17/10
(52) U.S. Cl. ................... 340/628; 340/630; 340/577; 382/103
(58) Field of Search ................ 340/628, 511, 340/630, 577; 382/103, 100, 228, 157

(56) References Cited

U.S. PATENT DOCUMENTS

| | | | | |
|---|---|---|---|---|
| 4,614,968 A | * | 9/1986 | Rattman et al. | 358/93 |
| 4,951,147 A | * | 8/1990 | Aknar et al. | 348/143 |
| 5,153,722 A | * | 10/1992 | Goedeke et al. | 358/108 |
| 5,237,308 A | | 8/1993 | Nakamura | 340/588 |
| 5,510,772 A | * | 4/1996 | Lasenby | 340/578 |
| 5,662,113 A | * | 9/1997 | Liu | 600/443 |
| 5,671,159 A | * | 9/1997 | Morita | 364/550 |
| 5,937,078 A | * | 8/1999 | Hyland et al. | 382/103 |
| 6,317,517 B1 | * | 11/2001 | Lu | 382/228 |

FOREIGN PATENT DOCUMENTS

| | | |
|---|---|---|
| DE | 196 03 828 A1 | 8/1997 |
| EP | 0 687 594 A1 | 12/1995 |
| WO | WO 97/16926 | 5/1997 |
| WO | WO 98/28706 | 7/1998 |

OTHER PUBLICATIONS

"Production System Environment for Integrating Knowledge with Vision Data", from Spatial Reasoning & Multi-Sensor Fusion, by K.M. Andress et al. (1987).
"Artificial Intelligence vol. 27" (1985).
"Signal Processing for Computer Vision" by Gösta H. Granlund, et al. (1995).
"Artificial Intelligence vol. 26" (1985).
"Pattern Recognition as to Statistical Approach" by Pierre A. Devijver, et al. (1982).
"Applied Image Processing", from MacMillan New Electronics: Introductions to Advanced Topics, by G.J. Awcock, et al. (1995).

(List continued on next page.)

Primary Examiner—Daniel J. Wu
Assistant Examiner—Phung Nguyen
(74) Attorney, Agent, or Firm—Ostrolenk, Faber, Gerb & Soffen, LLP

(57) ABSTRACT

A smoke detection system comprising video camera monitoring means, video frame comparison means, signal processing means, and alarm generating means dependant on an output from the signal processing means; the signal processing means being arranged to analyse successive frames acquired by the video camera monitoring means and to compare the intensity and/or colour of individual pixels or group of pixels so as to consider the overall characteristics and inter-relationships of these pixels so as to detect the presence of smoke characterised in that the signal processing means analyses a plurality of different types of change in the said characteristics and inter-relationships.

25 Claims, 1 Drawing Sheet

OTHER PUBLICATIONS

Figure 1:
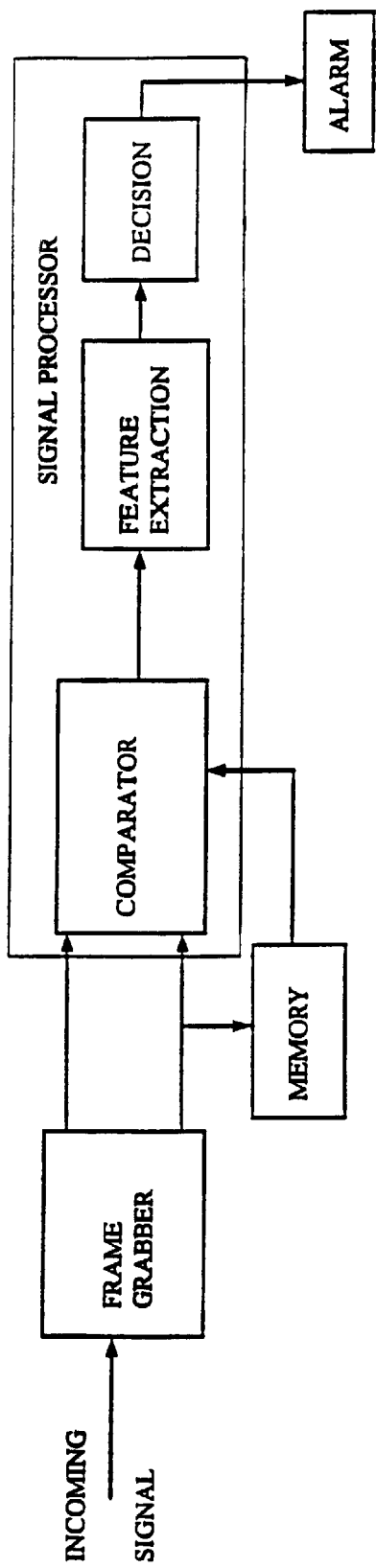

"Digital Image Processing" by Rafael C. Gonzalez, et al. (1993).

"Development of an Economical Video Based Fire Detection and Location System", from Department of Mechanical and Materials Engineering, Washington State University, by O.A. Plumb, et al. (1996).

"Detection and Alarming of Early Appearance of Fire Using CCTV Cameras", from Nuclear Engineering International, Fire & Safety '97 Conference, by R.F. Aird, et al. (1997).

"Wormald Safety News" (1998).

"VSD Ltd. Video Smoke Detection Business Plan" (1998).

"Installation and Commissioning Guide" from VSD Video Smoke Detection, by Intelsec Systems Limited (no date).

Communication of Notice of Opposition from European Patent Office dated Jul. 8, 2003.

Applicant Observations dated Dec. 5, 2003.

"Neural networks for pattern recognition" by U. Kessel, J. SchUrman and J Franke.

"Practice of the digital image processing and pattern recognition" by Haberaecker.

* cited by examiner

SMOKE DETECTION

CROSS-REFERENCE TO RELATED APPLICATIONS

This is a continuation application of International Application PCT GB 99/03459 with an International filing date of 20 Oct. 1999.

The present invention relates to smoke detection, and more particularly to smoke detection systems based on an analysis of video images.

It is sometimes necessary to monitor the environment of high risk equipment to ensure that dangerous potential fire hazards can be recognised at an early stage. Examples of areas where such monitoring is necessary include power station turbine halls and enclosed high risk regions such as traffic tunnels.

Continuous monitoring by operators viewing on closed circuit television screens is unsatisfactory since the image to be viewed is not conducive of a continuous watch since the image itself is uninteresting to an observer and only small changes to an image need to be detected. Surveillance by electronic means is therefore desirable.

A previous approach to this monitoring problem had been to use a video camera to monitor an area and then to identify when, through the presence of smoke, the pixel values of the picture monitored by the television camera became representative of a lighter image. The problem with this system was that it could not detect smoke against a light background or indeed fires which produce little smoke such as those emanating from propane.

Another problem is that of preventing false alarms caused by lighting changes such as people moving across the field of view. Previously that problem had been dealt with by examining an outer area, and then if changes occurred in that area, inhibiting the monitoring process in an inner region. This could result in delay in detection and also mean that only sources of smoke in the inner region be detected.

The present invention is concerned with provision of a smoke detection system which overcomes these problems and enables a potential fire risk situation to be recognised at an early stage.

Accordingly the present invention provides a smoke detection system comprising video camera monitoring means, video frame comparison means, signal processing means, and alarm generating means dependant on an output from the signal processing means; the signal processing means being arranged to analyse different frames acquired by the video camera monitoring means and to compare the intensity and/or colour of individual pixels or group of pixels so as to consider the overall characteristics and inter-relationships of these pixels so as to detect the presence of smoke characterised in that the signal processing means analyses a plurality of different types of change in the said characteristics and inter-relationships.

Generally the signal processing means will provide one frame (often, but not necessarily always, the immediately preceding frame) as a reference and compare the current frame with that reference. The signal processing means will compare, within a selected region of that frame, the manner in which pixels or groups of pixels have changed.

There are a series of different kinds of change which can be analysed and the following is a list of some of these:

an overall gate as a starting point to determine whether significant change has taken place value of pixels identified as converging towards a mean value. In effect this means that extremes of contrast are falling and the image is becoming more grey.

edge information changes. Edge information can be obtained by comparing two frames of which one has been shrunk by a few pixels relative to the other.

The edge information can be used in two ways to define an emerging smoke condition, the one being to ascertain when edge detail is being lost, and the other being to distinguish between a softly defined image such as a smoke cloud and a harder image such as a moving person.

dynamic parts of the overall image are identified as becoming static, or conversely static parts of the image become more dynamic.

compactness. This looks at the size and placement of measured differences in pixel content. If the changed pixels are distributed in small isolated groups this will be indicative of an emerging smoke condition.

opacity. Opacity is calculated by comparing the value (brightness or intensity) of the changed pixels to those in the reference image. It looks for a difference to indicate a reduction in visibility and hence the emergence of smoke.

shape. Characteristics of shape which are known to be representative of an emerging smoke or fire condition.

Generally at least three, preferably the first, second and third changes referred to above, should be analysed although other combinations of the types of changes can be employed.

In practice a rule based analysis will be used initially based on three or four of the different kinds of change, and if this indicates a potential smoke condition then statistical analysis will be carried out, for example by means of a Bayesian Analysis. The statistical analysis will generally be based on all measured changes while the rule based analysis may trigger a smoke condition based on only a few of the measured kinds of difference.

The rule based analysis may be operated by weighting each selected individual analysis and summing the result, for example using a point count system (the individual values of which are ascertained empirically) to provide a pass/fail form of scoring.

Generally a selected zone of the overall image will be analysed, and this may be selected to exclude non-typical regions of the screen area such as where personnel movement or other expected variation is likely to occur. Alternatively the whole area of the screen image may be analysed.

An embodiment of the invention will now be described by way of example with reference to the accompanying diagrammatic drawings in which:

FIG. 1 is a schematic arrangement of an apparatus according to the invention.

Referring to FIG. 1, an incoming signal enters a frame grabber from the output of one or more closed circuit video cameras and the output of the frame grabber goes firstly to a memory which retains each single frame image in turn and then it goes to a signal processor which includes a comparator for the analysis of differences between different frames and the pixels contained within those frames.

In this respect the comparator firstly compares the image with previous images and by subtraction obtains a signal representative of the difference between successive frames. The system also includes an adjustable threshold control level, for sensitivity setting and a means by which changes which are representative of signal noise can be eliminated.

The output of the comparator is then subjected to the main processing of the signal in accordance with the present invention. Essentially the signal processor is looking to see whether there are changes in the individual pixels of a frame and in the differences between adjacent pixels which would have been caused by smoke particles. Thus if such dangerous changes have arisen an alarm is set off. In parallel with this, a monitor screen shows the region being monitored and can have an enhanced image superimposed on the raw TV camera image produced, so that the danger area is emphasised to an observer.

Now the signal processor involves a number of separate analyses and these involve mathematical analysis by appropriate computer software in the signal process as part of the equipment.

The signal processing means has to include hardware and/or software to recognise the selected conditions of change so that the presence of a smoke condition can be identified.

The analysis can be based on the following:

Notation and Concepts

The system has two images to work with, where image is defined as an ordered set of pixels intensities.

First it is necessary to define the set of possible pixel intensity values $$Z=<0, 1, 2, 3, \ldots, M>$$

where M is the maximum pixel value.

An image is defined as an ordered set of pixel values where a pixel value is defined as:

$$i_j \epsilon Z$$

Therefore an image can be denoted as follows $$I=<i_0, i_1, i_2, i_3, i_4, \ldots i_N>$$

Where N is the number of pixels in an image.

The system provides two images in order to evaluate the various changes. These images are R the reference image
C the current image Given that a change has been identified this change is used to define a sub-set of the images.

$$R_\Delta \subseteq R$$

$$C_\Delta \subseteq C$$

With these sub-sets defined, the following metrics are evalulated:

Convergence to a Common Mean

There is the reference image R and the current image C. The set of pixels which are deemed to have changed are denoted $C_\Delta$ and $R_{66}$.

Let m be the mean value of the changes in C i.e.

$$m = \frac{1}{\#C_\Delta} \sum C_\Delta$$

where
S denotes the number of element in the ordered set S and ΣS denotes the sum of all elements in the ordered set S.

Once the value m has been defined the number of pixels whose intensity is approaching m with respect their corresponding value in the reference image is evaluated. With the same images the number of pixels whose intensities are departing from this mean value is also calculated.

$$n\text{towards}=\Sigma\{\text{sign}(C_\Delta-R_\Delta)=\text{sign}(C_\Delta-m)\}$$

$$n\text{away}=\Sigma\{\text{sign}(C_\Delta-R_\Delta)\neq\text{sign}(C_\Delta-m)\}$$

where the function sign is defined as follows for scalar values, when applied to an ordered set it is $$\text{sign}(x) \rightarrow \begin{array}{l} x<0:-1 \\ x=0:0 \\ x>0:1 \end{array}$$

defined to return an ordered set of values.

These two values provide a metric of "convergence to the common mean value" and passed forward to the decision system.

Static Becomes Dynamic

For any area which is being investigated, the consistency of the changing area is evaluated over time in order to assess if that area is dynamic in terms of its overall appearance or static. Lighting changes alter the image but the overall appearance does not change. The correlation function is used to evaluate this similarity over time since it is invariant to both scale and gain changes. If an object obscures the background by moving into the area of interest then the appearance within the area of interest will change. If the correlation fluctuates sufficiently over time then the area is deemed to be dynamic. This measure of consistency is forwarded to the decision system.

Edge Content

A change in edge information is defined as a change in the value of the edge measure. The edge measure is defined as the sum of the responses of a standard derivative filter kernel where changes have been detected by the previous stage. A standard filter which is employed is the Sobel edge filter. This measure of edge content is forwarded to the decision system.

Characteristics of Shape

Various shape characteristics are employed including density and aspect ratio.

Density is defined as the average number of occupied neighbours for all members of the change set. A "four connectivity" scheme is adapted and consequently the average value of density lies in the range 0 to 4.

The aspect ratio is the ratio of the height to the width of the changed region.

When the density, aspect ratio and pixel count (i.e. the number of pixels that have changed in an area) are taken together they describe some of the shape characteristics of the changed area. These values are forwarded to the decision system.

System Description

The smoke detection hardware accepts video input on up to six parallel video streams. The hardware consists of an industrial PC with a 200 MHz MMX Pentium processor and 32 MB of system RAM. The PC contains a frame-grabber card, of type MP300. The smoke detection software is written in C++, compiled using the WATCOM C++ compiler. The features described below in this invention are encapsulated in around 50 source code files and a further 50 header files, comprising an estimated 40,000 lines of code in all.

Algorithm Overview

The smoke detection algorithm examines, in general terms, the following features of a digitised video stream to determine whether smoke has been detected:

Pixels (or groups of pixels) moving towards a mean value
Edge information edge definition—this may increase or decrease as smoke emerges (depending on what it was like before)

Whether the image overall is static or dynamic

Emerging new shapes in the image—comparison of characteristic shape with indicative smoke shapes The system works out the differences between the current image and a reference image. Important parts of the analysis are as follows:

Where image pixels appear to have changed, the algorithms work out whether the image pixels are approaching or deviating from some common mean value Edges—sum of responses of a standard deviation filter where changes were previously detected (the Sobel edge filter)

Correlation function to determine similarity over time.

Shape: density of the "changed" region—four nearest neighbours possible; aspect ratio; total area Zones Zones are rectangular regions selected from the entire image by the user when the system is installed. These would typically be arranged to cover likely areas where smoke might be produced, and (more importantly) not cover problem areas of the scene. Each zone is processed entirely separately, and the outputs from each zone may be combined to generate alarms as required. Pixels in the zone may additionally be eliminated so that they are not included in the calculations—for example, the filament of a light bulb, or a shiny metal object that glints in the sunlight. Again, these are selected by the user when the system is commissioned. At any one time there are two primary sets of image data for the zone—the current image and the reference image. The pixels in these images are denoted by x and $x_r$ respectively, in the discussions below.

Within each zone, a set of n parameters are calculated. These parameters are formed into an n-dimensional "vector", defining a "feature" space.

Image Data (Planes) Stored in the Program

The following key image plane sets are stored by the software for each zone:

current image data reference reference image data change raw changed pixels environment edge-sensitive detector values from reference image data filter the combined "mask"

previous previous value of "filter"

eliminate mask of pixels eliminated manually

Basic Operation

Frames are acquired from the frame grabber card on a regular basis. After any adjustments to normalise the brightness and contrast, the system compares the most recently acquired frame (current) with the reference frame. If pixels differ by more than an adjustable threshold (camera noise may be taken into account too), then the pixel is deemed to have changed.

The reference image is acquired periodically, when the system has detected no changes in the scene, and when the system determines that the current scene is no longer similar enough to the reference image. This reference image is analysed to generate an "environment mask", using the EDGE algorithm below. This essentially indicates where there is edge detail in the zone.

A pixel-by-pixel "filter" mask, used in the calculations detailed below, is constructed by combining the changed pixels with the environment mask. The changed pixel mask is only copied to the final filter mask at points where the magnitude of the difference between the current and the reference pixel exceeds the edge detail pixel value. Pixels selected manually as being problematic are also eliminated from this mask at this stage.

Low-Level Image Processing Operations

A large set of different image processing operations are carried out on the zone image data. Some of these operations use only the unmasked pixels, others operate on the entire set of pixels. These parameters are the raw data fed into the final smoke detection algorithms. They are all relatively straightforward image processing primitives, but the definitions used in the algorithm are reproduced below for completeness.

MEAN

This is the simple mean value of the N pixel values, x, in the zone.

$$\text{MEAN} = \langle x \rangle = \frac{\sum x}{N}$$

TOWARDS_COMMON_MEAN

This parameter counts the number of unmasked pixels in the image that deviate from the mean with the same sign as they do in the reference image.

$$\text{TOWARDS} = \Sigma[\text{sign}(x-x_r) == \text{sign}(\langle x \rangle - x_r)]$$

FROM_COMMON_MEAN

This parameter counts the number of unmasked pixels in the image that deviate from the mean with the opposite sign from the way they do in the reference image.

$$\text{FROM} = \Sigma[\text{sign}(x-x_r) = \text{sign}(\langle x \rangle - x_r)]$$

COFGX

The mean x-co-ordinate of the unmasked pixels in the zone (this will change as areas in the zone are masked out)

COFGY

The mean y-co-ordinate of the unmasked pixels in the zone (this will change as areas in the zone are masked out)

SIZE

The total number of pixels in the zone, including the masked pixels

COUNT

The total number of unmasked pixels in the zone (i.e. excluding the masked pixels)

EDGE

The edge content algorithm looks at, for each unmasked pixel in the current image, the four adjacent pixels (up/down/left/right). It sums the sum of the magnitude of the differences between the left and right, and between the up and down pixels, for pixels where this exceeds a threshold value set by the user.

$$\text{EDGE} = \Sigma[\{|x_{up} - x_{down}| + |x_{left} - x_{right}|\}(\text{if} > \text{threshold})]$$

EDGE_REF

The calculates the EDGE function, but based on the reference image pixels, instead of the current image pixels

CORRELATION

This is the correlation between the reference and the current image. This is calculated as:

$$CORR = \frac{(N * \sum xx_r - \sum x \sum x_r)}{\sqrt{(N * \sum x^2 - (\sum x)^2) \times (N * \sum x_r^2 - (\sum x_r)^2)}}$$

The correlation function is used as an overall "gate" to the detection process. If this correlation is greater than a preset SIMILARITY, then no further processing is carried out on the zone. This corresponds to the case where the image is essentially the same as the reference image.

CORRELATION_MASKED

The masked correlation calculates the same function as the correlation function above, considering only those pixels that are not masked.

VARIANCE

This is the standard variance of the pixel value, x, including all the pixels, calculated as $$VAR = \langle x^2 \rangle - \langle x \rangle^2 = \frac{\sum x^2}{N} - \left(\frac{\sum x}{N}\right)^2$$

VARIANCE_REF

This is the standard variance of the reference pixel values, $x_r$, including all the pixels, calculated as $$VAR = \langle x_r^2 \rangle - \langle x_r \rangle^{2\prime} = \frac{\sum x_r^2}{N} - \left(\frac{\sum x_r}{N}\right)^2$$

SKEW, KURTOSIS and FIFTH

These parameters look at the distribution of all the pixel values in the current image. As an example, the pixel values might have a Gaussian distribution about the mean pixel value, or the distribution might be asymmetric or otherwise non-Gaussian. Parameters such as skew, kurtosis and fifth are well known parameters used in statistics to analyse the non-Gaussian nature of distributions. They are calculated as follows:

Denoting $\sigma = \sqrt{\langle x^2 \rangle - \langle x \rangle^2}$ $$SKEW = \frac{1}{N} \sum \left[\frac{x - \langle x \rangle}{\sigma}\right]^3$$

$$KURTOSIS = \frac{1}{N} \sum \left[\frac{x - \langle x \rangle}{\sigma}\right]^4$$

$$FIFTH = \frac{1}{N} \sum \left[\frac{x - \langle x \rangle}{\sigma}\right]^5$$

SKEW_REF, KURTOSIS_REF and FIFTH_REF

These look at the distribution, as above, in the reference image instead of the current image.

COMPACTNESS

This function looks at the four nearest pixels to each unmasked pixel, and calculates the mean number of these that are unmasked.

OPACITY

Opacity is calculated, for the unmasked pixels only, as $$OPACITY = \frac{1}{N} \sum \left[\frac{x - x_r}{\langle x \rangle - x_r}\right]$$

RUNNING_CORRELATION_MEAN

This is the standard deviation of the CORRELATION as defined above. This is a running mean, as it is simply calculated from a set of total running sums.

RUNNING_MEAN_MEAN

This is the mean value of the masked correlation—as a running value.

EDGE_EVIDENCE

This is based on a mask of particular edges in the image. This mask is shrunk by one or two pixels all round. The unmasked pixels in the current and reference images are examined using the EDGE algorithm above. The routine then calculates the mean ratio of the pixels in the EDGE'd current image and those in the EDGE'd reference image, within the unmasked region, provided that the reference image contained a non-zero value.

PERCENTAGE_CHANGE

This is a measure of the percentage change in the number of masked pixels between the previous "filter" mask and the present one. These are Boolean masks, and the percentage change is calculated simply on the basis of the numbers of pixels that are non-zero (TRUE) in just one of the two images, normalised by the number that are non-zero in either or both.

The filter masks are "eroded" before this calculation, using an algorithm that only allows TRUE pixels to remain if all of its original four neighbours were also TRUE. This is a form of filtering to reduce the noise.

Rule-Based Analysis

Rule-based analysis is used initially to determine whether a change in the image has occurred, and whether this change is significant. If it is, then further analysis is carried out to see if the change is considered to be associated with smoke, or whether it is associated with, say, a person walking across the scene.

The rule-based analysis uses a scoring system, where points are allocated for each rule which is met. If the points total exceeds a (variable) criteria (typically 90% of the maximum score), the analysis moves to the next level.

The analysis is carried out on a region, which is a subset of the area of the zone, defined by the edges of the unmasked pixels.

Check for No Correlation

If the running correlation for this zone is very small (RUNNING_CORRELATION_MEAN<0.1), this means that the reference image and the current image are no longer similar (e.g. because the camera moved). If the image is not changing (PERCENTAGE_CHANGE<0.3), then it is time to update the zone's reference image, and abandon the current check for smoke.

Correlation Less Than Threshold

If the correlation is less than the user-defined threshold, two points are scored, otherwise the check is abandoned.

Towards or From Common Mean

If the pixel values are tending towards the common mean, then this could indicate the presence of smoke (the whole image is becoming uniform grey). The algorithm looks at the ratio of the towards to from terms, and if this exceeds a user-adjustable ratio, three points are scored.

Edge-ness

The "edge-ness" of the region is the ratio of the EDGES to the COUNT of pixels in the image. This is calculated both for the current and the reference image. If the current image edge-ness is outside a preset band, three points are scored. An additional three points are scored if the edge-ness deviates from the reference edge-ness by more than a preset percentage—selectably either up or down.

Compactness

The COMPACTNESS (defined above) must lie within a preset band. If it deviates outside of this, three points are scored.

Edge Evidence

The EDGE_EVIDENCE is decreased by the presence of smoke. If it falls below a preset threshold, three points are scored.

Scoring against Criteria

The user may determine, when setting up the system, a subset of the available tests to carry out. The maximum score will be less, and the is take into account when determining whether the score has exceeded 90% of the maximum value. If it has, a Bayesian analysis is then carried out.

Bayesian Analysis

Bayesian analysis provides us with a well founded decision criteria which takes into account the co-variance of features and provides the ability to discriminate between different classes of event (nuisance and real alarms). An important fact to note when defining features for use with Bayesian analysis is that they should be invariant to external influences such as background and lighting. The algorithm can cope with some variation but in general the effects of external influences should be kept to a minimum.

Bayesian statistics are a useful tool in making decisions with multivariate systems such as this. The parameters (MEAN, TOWARDS_COMMON_MEAN etc) are combined together into an n-dimensional vector. These vectors are used to "train" the system by building up a set of statistics. More specifically, the system stores data for nuisance and real alarms as separate classes. For an n-dimensional vector v the sums s and S are calculated for N different alarm events as follows, separately for nuisance and real alarms.

$$s = \Sigma v$$

$$S = \Sigma v v^T$$

The Bayesian decision function takes a vector, v, from the current zone/region, and calculates a real decision value, d, as follows:

$$m = \frac{s}{N}$$

$$C = \frac{S}{N} - mm^T$$

$$d = 0.5 \times (\log|C| + (v-m)^T C^{-1} \cdot (v-m))$$

d is calculated against the two reference classes—nuisance and real, giving $d_n$ and $d_r$. If $d_r$ is greater than $d_n$, the Bayesian analysis signals an alarm condition.

If problems are experienced with overlapping responses in $d_n$ and $d_r$, this might be solved by increasing the number of features and hence moving a to higher dimensional spaces (the probability of clouds overlapping by chance reduces as the dimensionality is increased).

Combination of Rules and Bayesian Analysis

It is crucial that the smoke detection system avoids false alarms. This is a key part of the system.

Thus an important feature of the invention is to combine a rule-based analysis with a statistically based analysis, and particularly with one based on Bayesian analysis. The rule based analysis takes place first and if certain criteria are met then the Bayesian analysis is instigated.

Frequently, the Bayesian analysis and the rule-based analysis disagree. In this case, the confidence in the Bayesian analysis is used to determine whether the alarm is real or nuisance. The difference between real and nuisance is based on experience and the system builds up in accuracy over time.

If the Bayesian analysis showed an alarm, but the rule-based analysis did not, The difference between the values of $d_r$ and $d_n$ is used as a measure of the confidence in the alarm. If this exceeds the minimum confidence level, then an alarm is signalled, even though the rule-based analysis did not trigger and alarm If the rule based analysis showed an alarm, and the Bayesian treatment did not, if the difference between $d_n$ and $d_r$ is more than the minimum confidence level, the alarm is cancelled.

If there is no alarm, but the correlation between the current and reference images is small, and the percentage change function is low, the reference image is updated. This effectively adjusts for changes in, for example, lighting level.

What is claimed is:

1. A smoke detection system comprising a video camera monitoring arrangement to capture successive frames of an image to be monitored, a video frame comparator coupled to the video camera monitoring arrangement, a signal processor coupled to the frame comparator, and an alarm generator coupled to the signal processor, the alarm generator operating in dependence on an output of the signal processor; the signal processor being operable to analyze the successive frames and to compare at least one an intensity and a color of one of individual pixels and groups of pixels of at least two of the successive frames to consider overall characteristics and inter-relationships of the one of pixels and groups of pixels to detect a presence of smoke wherein the signal processor analyses a plurality of different types of change in the characteristics and inter-relationships by a combination of a weighted rule based analysis and a statistically based analysis.

2. A smoke detection system according to claim 1 in which the statistically based analysis is a Bayesian analysis.

3. A smoke detection system according to claim 1 in which one of the different types of change in the characteristics and inter-relationships includes whether the at least one of intensity and color are converging towards a mean value.

4. A smoke detection system according to claim 3 in which a plurality of the successive frames are arranged to be analyzed and the at least one of intensity and color is examined to determine whether the at least one of intensity and color is converging to a mean value.

5. A smoke detection system according to claim 1 in which the pixels include edge defining pixels that define edge information, one of the different types of change in the characteristics and inter-relationships including whether the edge defining pixels change from showing a structured level of information to showing a less structured level of information.

6. A smoke detection system according to claim 1 in which one of the different types of change in the characteristics and inter-relationships includes whether dynamic portions of the successive frames are becoming static.

7. A smoke detection system according to claim 1 in which one of the different types of change in the characteristics and inter-relationships includes whether measured differences of the at least one of intensity and color are distributed in small isolated groups.

8. A smoke detection system according to claim 1 in which the successive frames include a reference frame and a current frame, one of the different types of change in the characteristics and inter-relationships including whether measured changes in a value of the at least one of intensity and color between the reference frame and the current frame indicate a reduction in visibility.

9. A smoke detection system according to claim 1 in which one of the different types of change in the characteristics and inter-relationships includes whether new regions of the successive frames have characteristics of shape that resemble those of known shape characteristics of one of an emerging smoke and an emerging fire condition.

10. A smoke detection system according to claim 1 in which the pixels include edge defining pixels that define edge information an the different types of change in the characteristics and inter-relationships include a first type of change and a second type of change, the first type of change including whether the at least one of intensity and color are converging towards a mean value, the second type of change including whether the edge defining pixels change from showing a structured level of information to showing a less structured level of information.

11. A smoke detection system according to claim 1 in which the different types of change in the characteristics and inter-relationship include a first type of change and a second type of change, the first type of change including whether the at least one of intensity and color are converging towards a mean value, the second type of change including whether dynamic portions of the successive frames are becoming static.

12. A smoke detection system according claim 1 in which the different types of change in the characteristics and inter-relationship include a first type of change and a second type of change, the first type of change including whether the at least one of the intensity and color are converging towards a mean value, the second type of change including whether measured differences of the at least one of intensity and color are distributed in small isolated groups.

13. A smoke detection system according claim 1 in which the successive frames include a reference frame and a current frame, the different types of change in the characteristics and inter-relationships including a first type of change and a second type of change, the first type of change including whether the at least one of intensity and color are converging towards a mean value, the second type of change including whether the at least one of intensity and color of the reference current frames indicate a reduction in visibility.

14. A smoke detection system according to claim 1 in which the different types of change in the characteristics and inter-relationship include a first type of change and a second type of change, the first type of change including whether the at least one of intensity and color are converging towards a mean value, the second type of change including whether new regions of the successive frames have characteristics of shape that resemble those of known shape characteristics of one of an emerging smoke and an emerging fire condition.

15. A smoke detection system according to claim 1 in which the pixels include edge defining pixels that define edge information, the different types of change in the characteristics and inter-relationships including a first type of change and a second type of change, the first type of change including whether the edge defining pixels change from showing a structured level of information to showing a less structured level of information, the second type of change including whether dynamic portions of the successive frames are becoming static.

16. A smoke detection system according to claim 1 in which the pixels include edge defining pixels that define edge information, the different types of change in the characteristics and inter-relationships including a first type of change and a second type of change, the first type of change including whether the edge defining pixels change from showing a structured level of information to showing a less structured level of information, the second type of change including whether measured differences in the at least one of intensity and color are distributed in small isolated groups.

17. A smoke detection system according to claim 1 in which the successive frames include a reference frame and a current frame, the pixels including edge defining pixels that define edge information, the different types of change in the characteristics and inter-relationships including a first type of change and a second type of change, the first type of change including whether the edge defining pixels change from showing a structured level of information to showing a less structured level of information, the second type of change including whether changes of the at least one of intensity and color between the reference and current frames indicate a reduction in visibility.

18. A smoke detection system according to claim 1 in which the pixels including edge defining pixels that define edge information, the different types of change in the characteristics and inter-relationships including a first type of change and a second type of change, the first type of change including whether the edge defining pixels change from showing a structured level of information to showing a less structured level of information, the second type of change including whether new regions of the successive frames have characteristics of shape that resemble those of known shape characteristics of one of an emerging smoke and an emerging fire condition.

19. A smoke detection system according to claim 1 in which the different types of change in the characteristics and inter-relationships include a first type of change and a second type of change, the first type of change including whether dynamic potions of the successive frames are becoming static, the second type of change including whether measured differences of the at least one of intensity and color are distributed in small isolated groups.

20. A smoke detection system according to claim 1 in which the successive frames include a reference frame and a current frame, the different types of change in the characteristics and inter-relationships including a first type of change and a second type of change, the first type of change including whether dynamic potions of the successive frames are becoming static, the second type of change including whether change in the at least one of intensity and color between the reference and current frames indicate a reduction in visibility.

21. A smoke detection system according to claim 1 in which the different types of change in the characteristics and inter-relationships include a first type of change and a second type of change, the first type of change including whether dynamic potions of the successive frames are becoming static, the second type of change including whether new regions of the successive frames have characteristics of shape that resemble those of known shape characteristics of one of an emerging smoke and an emerging fire condition.

22. A smoke detection system according to claim 1 in which the successive frames include a reference frame and a current frame, the different types of change in the characteristics and inter-relationships including a first type of change and a second type of change, the first type of change including whether measured differences of the at least one of intensity and color are distributed in small isolated groups, the second type of change including whether changes in the at least one of intensity and color between the reference and current frames indicate a reduction in visibility.

23. A smoke detection system according to claim 1 in which the different types of change in the characteristics and inter-relationships include a first type of change and a second type of change, the first type of change including whether measured differences of the at least one of intensity and color are distributed in small isolated groups, the second type of change including whether new regions of the successive frames have characteristics of shape that resemble those of known shape characteristics of one of an emerging smoke and an emerging fire condition.

24. A smoke detection system according to claim 1 in which the successive frames include a reference frame and a current frame, the different types of change in the characteristics and inter-relationships include a first type of change and a second type of change, the first type of change including whether changes in the at least one of intensity and color between the reference and current frames indicate a reduction in visibility, the second type of change including whether new regions of the successive frames have characteristics of shape that resemble those of known shape characteristics of one of an emerging smoke and an emerging fire condition.

25. A smoke detection system according to claim 1 in which the pixels include edge defining pixels that define edge information, the different types of change in the characteristics and inter-relationships including first, second, third and fourth types of change, the first type of change including whether values of the at least one of intensity and color are converging towards a mean value, the second type of change including whether the edge defining pixels change from showing a structured level of information to showing a less structured level of information, the third type of change including whether the image of the successive frames moves in an unpredictable manner and ceases to be static and the fourth type of change including whether new regions of the successive frames have shape characteristics that resemble those of known shape characteristics of one of an emerging smoke and an emerging fire condition.

* * * * *